(12) United States Patent
Devta et al.

(10) Patent No.: US 9,639,539 B1
(45) Date of Patent: May 2, 2017

(54) METHOD OF FILE LEVEL ARCHIVING BASED ON FILE DATA RELEVANCE

(71) Applicant: EMC IP Holding Company LLC, Hopkinton, MA (US)

(72) Inventors: Prakash Kumar Devta, Bangalore (IN); Umasankar Pradhan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 13/630,000

(22) Filed: Sep. 28, 2012

(51) Int. Cl.
*G06F 17/30* (2006.01)
(52) U.S. Cl.
CPC .. *G06F 17/30082* (2013.01); *G06F 17/30221* (2013.01)

(58) Field of Classification Search
None
See application file for complete search history.

(56) References Cited

U.S. PATENT DOCUMENTS

| | | | |
|---|---|---|---|
| 2007/0083575 A1* | 4/2007 | Leung et al. | 707/205 |
| 2009/0319532 A1* | 12/2009 | Akelbein et al. | 707/10 |
| 2010/0293334 A1* | 11/2010 | Xun et al. | 711/129 |
| 2013/0246216 A1* | 9/2013 | Chau et al. | 705/26.7 |

* cited by examiner

*Primary Examiner* — Belix M Ortiz Ditren
(74) *Attorney, Agent, or Firm* — Staniford Tomita LLP

(57) ABSTRACT

A method and system for archiving data based on a defined relevance attribute is discussed. This attribute may be based on the data's importance to a business or user. In an embodiment, more important data may be placed in high-end storage and less critical data may be placed in low-end storage.

17 Claims, 9 Drawing Sheets

METHOD OF FILE LEVEL ARCHIVING BASED ON FILE DATA RELEVANCE

FIELD OF THE INVENTION

This invention relates generally to information archiving, and more particularly to systems and methods for archiving data based on a content relevance attribute.

BACKGROUND OF THE INVENTION

Computer systems may contain a large amount of data, some of which is seldom used or accessed. Throughout a workday, users may frequently view, create, or modify documents, thereby increasing this amount of data. Additionally, each of these documents may be saved to local or remote storage. Computer systems, however, may have limited storage resources. Adding additional resources may be costly and inconvenient, such as when a user's local storage needs to be increased. The user could be, for example, deprived of his machine for a period of time while new storage is installed. Further, if a mistake occurs during the installation process, the user's data may be lost. Users therefore often need a scalable storage option for backing up and restoring their data.

Archiving data to remote, scalable storage may help alleviate the inconvenience associated with storage expansion. Once a data object has been archived remotely, it may be removed from the local system to increase storage capacity. The archiving process may, however, be based on factors beyond a user's control. The computer system may have no mechanism for determining which data objects are important to the user. For example, the system may be unable to differentiate between business-critical and non-critical documents. Additionally or alternatively, a user's priorities may change and once non-critical documents may suddenly become more important. As a result, the system may arbitrarily give archiving priority to the non-critical documents over the critical ones. When a user attempts to recover the critical documents, the documents may be unavailable or archived on low-cost, low-performance storage. As a result, time may be wasted and information lost.

There is a need, therefore, for an improved method, article of manufacture, and apparatus for archiving data based on its criticality to the user.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
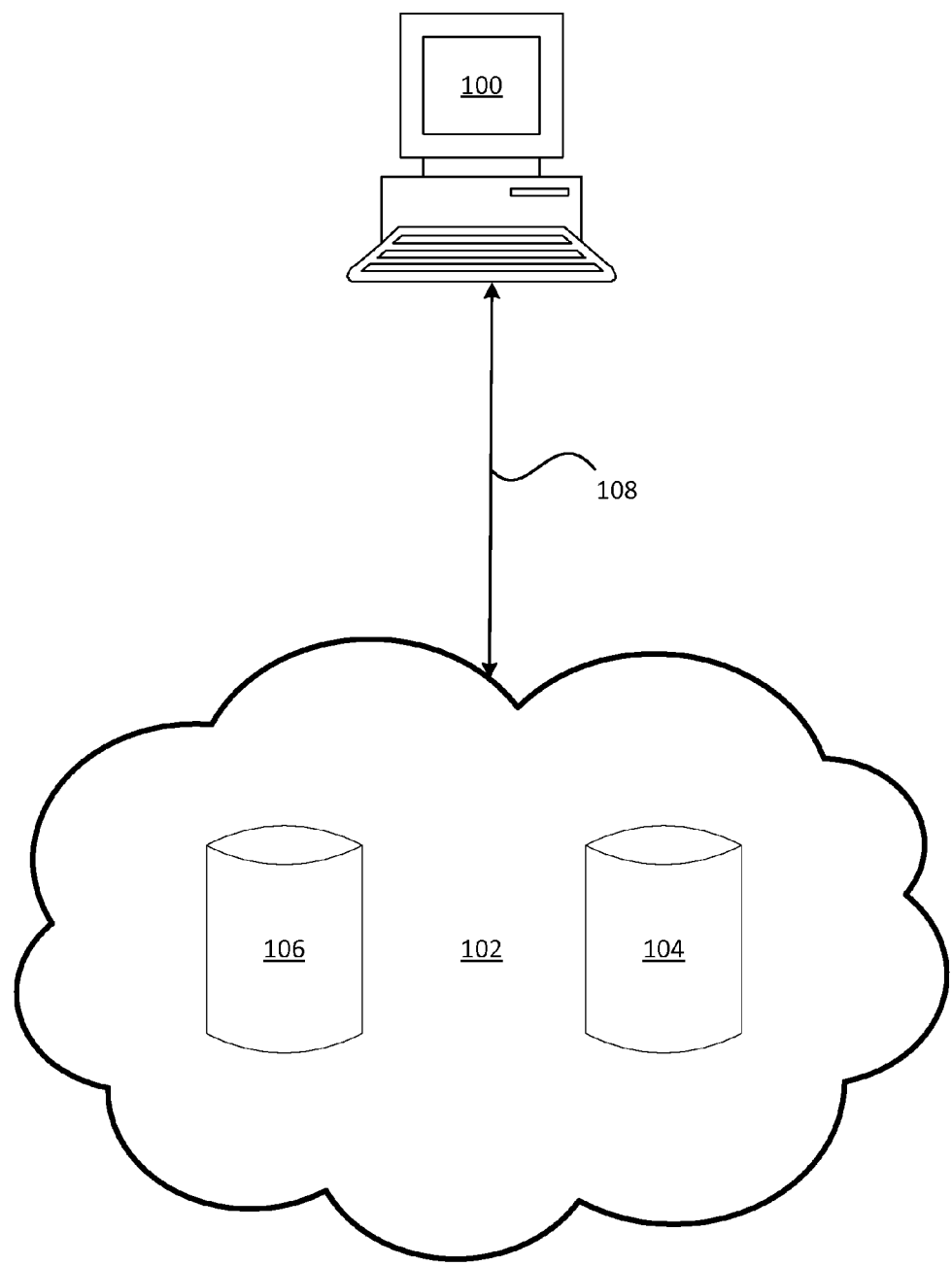
FIG. 1 illustrates a tiered storage architecture consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure provides a system and method for backing up or archiving data objects based on the criticality or relevance of the objects to a user or business. A relevance attribute is provided on a data object, which may be a computer file or directory. The attribute may be assigned a value indicating that data object's importance, and a system may consider the value when archiving data objects. In an embodiment, data objects of higher importance may be archived to high-end storage for increased performance and accessibility. Data objects with lower importance may be archived to low-end storage to reduce cost. Additionally or alternatively, the relevance value may be manually assigned by the user or dynamically determined by analyzing a data object's content.

FIG. 1 depicts a tiered storage architecture consistent with an embodiment of the present invention. User device 100 may be in communication with remote storage 102 over network connection 108, which may be a wired, wireless, or cellular connection. Remote storage 102 may comprise high-end storage 106 and low-end storage 104. User device 100 may archive user files to remote storage 102 using an archiving software solution, such as EMC DiskXtender.

In an embodiment, high-end storage 106 may comprise a high performance and/or high availability storage solution. For example, high-end storage 106 may comprise high performance fiber channel, iSCSI, serial attached SCSI, or solid state drives. In an embodiment, high-end storage 106 may be a Symmetrix VMAXe system. High-end storage 106 may be used to store critical data objects which are accessed and updated often. The increased performance may allow many operations to be performed on a data object with little impact to system usability.

Low-end storage 104 may comprise a low performance and/or high capacity storage solutions. For example, low-end storage may comprise magnetic tape or a low speed hard drive. Additionally or alternatively, low-end storage may use a low throughput serial ATA connection. Low-end storage may be available at a lower cost than high-end storage, and therefore may beneficial when archiving low priority data objects.

In an embodiment, one or more additional tiers may be used in conjunction with high-end storage 106 and low-end storage 104. Each tier may have varied performance in relation to the tier above and/or below. For example, a mid-end storage solution may have an inferior performance to high-end storage 106, but superior performance to low-end storage 104. The system may be scalable, and tiers may be dynamically added or removed based on user or business needs.

Figure 2:
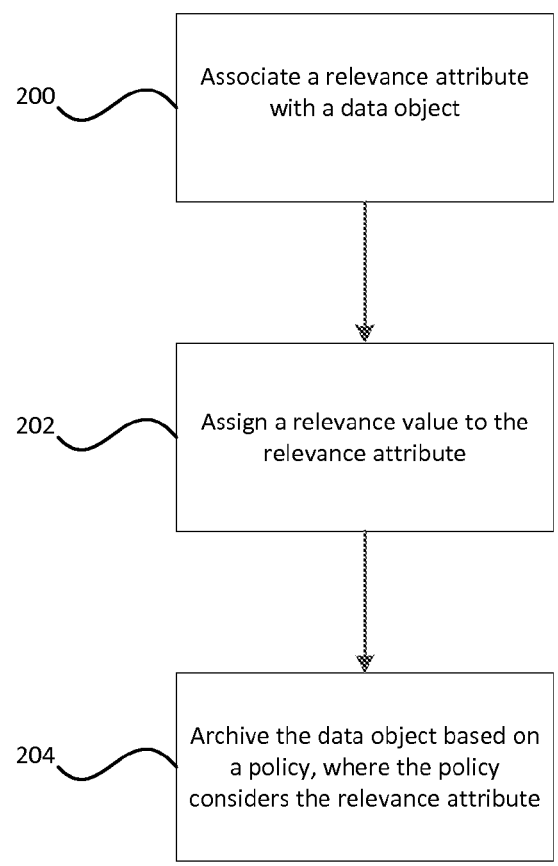
FIG. 2 is a flowchart of a method for archiving data based on a relevance attribute consistent with an embodiment of the present disclosure.

Turning now to FIG. 2, a method for archiving data objects based on an assigned relevance attribute is discussed. At 200 a relevance attribute is associated with a data object. For example, the attribute could be an extended meta-data attribute, and/or may be part of the data object. Additionally or alternatively, an index of data objects may associate the relevance attribute to the data objects. This index may comprise a list of objects in the system or in a directory, and may include an attribute for some or every object. When the index comprises a list of objects in a directory, the index itself may be stored in the directory. Additionally or alternatively, all the indexes may be stored at a common location.

At 202, a relevance value may be assigned to the relevance attribute. For example, a user or policy engine may assign a percentage value to the relevance attribute. This value may represent the data object's importance to the user, and may be used to archive information appropriately. The value may be a percentage, integer, alpha-numeric value, or any other indicia conveying priority.

At 204, the data object is archived based on a policy. This policy may consider the relevance value exclusively, or may consider additional factors, data attributes, or user parameters. For example, if the relevance factor is a percentage the policy may give a data object with a higher percentage value priority over a data object with a lower percentage value. Additionally or alternatively, lower percentage values may be prioritized over higher percentage values.

The policy may also consider additional data attributes, user parameters, or other factors. For example, the policy may consider metadata such as file type, file size, file ownership/permissions, and/or file modification/access time. Additionally or alternatively, user defined attributes such as category or author may be considered. In an embodiment, external factors such as a user's identity may be considered. For example, a CFO's files may be prioritized over other employees.

The process may archive the data object to a remote location, such as remote storage 102. In an embodiment, an archived data object may be replaced on the user's machine by a file stub, short cut, soft link, or other object reference. The data object itself may be removed from the machine, thereby releasing storage resources. When a user accesses the object reference, the data object may be retrieved from the remote storage. A local copy of the object may be restored to the user's machine, or it may be manipulated on the remote storage device.

Additionally or alternatively, a backup of the data object may be taken at 204. The backup may consider a data object's relevance value and grant priority to objects with higher values. When the backup is taken, a local copy of the data object may remain on the user's machine. Any attempt to manipulate the object could, for example, only impact the local object. In an embodiment, the backup is used to restore the object when the local file is lost, deleted, corrupted, or otherwise inaccessible.

Figure 3:
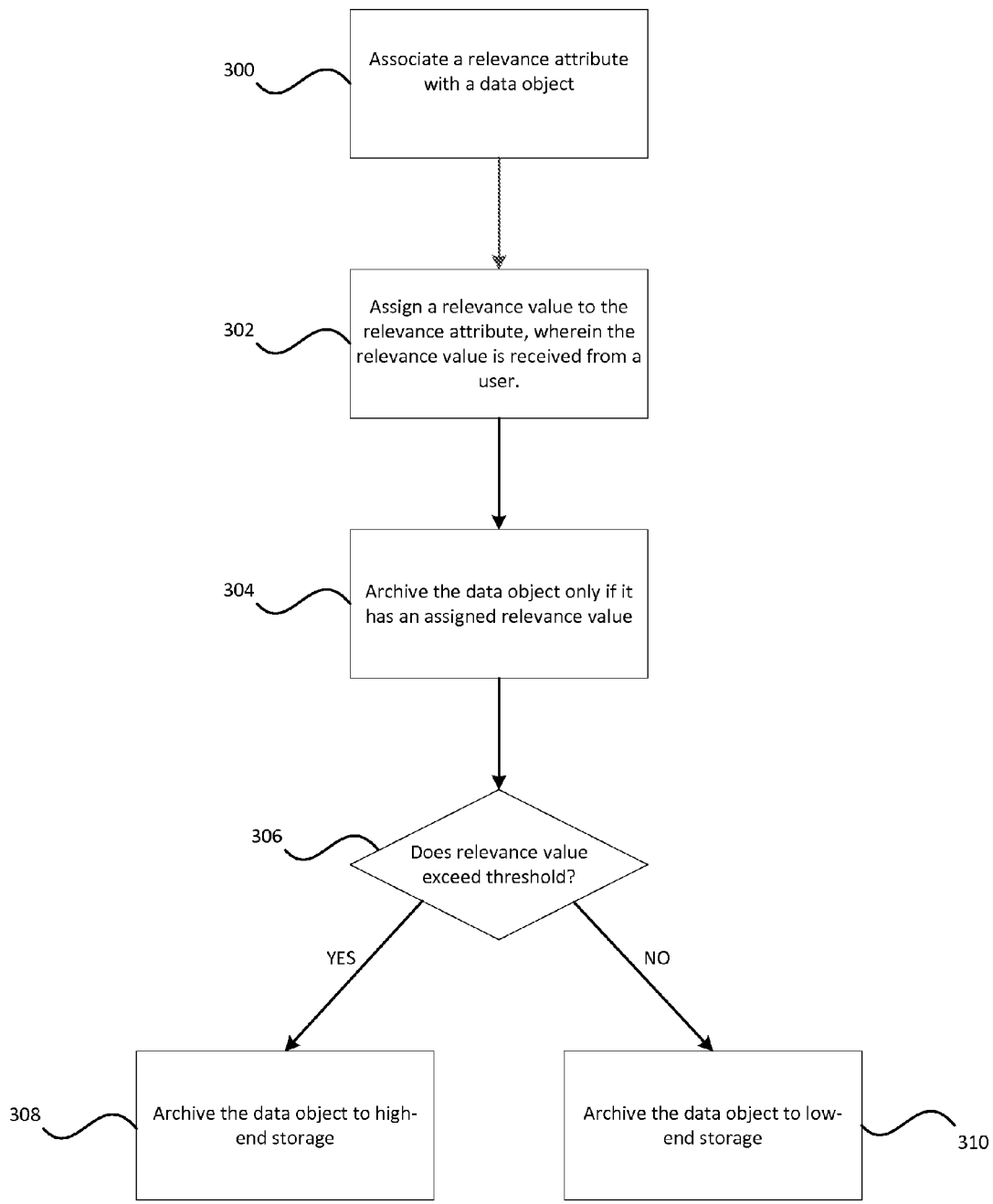
FIG. 3 is a flowchart of a method for assigning a relevance value to a relevance attribute, and for determining an archive location in accordance with an embodiment of the present disclosure.

Turning now to FIG. 3, a process for dynamically archiving a data object to high-end and/or low-end storage is discussed. At 300, a relevance attribute may be associated with a data object. This association could be, for example, substantially similar to the associate at block 200.

At 302, a relevance value is received from a user and assigned to the attribute. In an embodiment, this value is based on a data object's contents. For example, a user may assign a higher relevance to a document with business critical content. If a user's priorities later change, he may modify the value to correctly represent its relevance to the new priorities.

At 304, a decision is made whether or not to archive the data object. In an embodiment, if a data object does not have an assigned relevance value the object will not be archived. This could occur, for example, if a user forgot or chose not to assign a relevance value at 302. Additionally or alternatively, default relevance values may be assigned. For example, if a data object does not have an assigned value the system may dynamically assign the lowest possible value, highest possible value, mid-value, user defined default value, or any other value. If a default value is used, the process may continue to 306 even if the data object does not have a user defined relevance value.

At 306, the relevance value is compared to a threshold. This threshold may used to determine whether to archive the data object to high-end or low-end storage. In an embodiment, the threshold is defined by the user. For example, the user could define a threshold of 60% and every data object with a relevance value exceeding that threshold may be deemed critically important. These data objects may be archived to high-end storage at block 308, such as high-end storage 106. In an embodiment, if a relevance value fails to exceed the threshold it may be archived to low-end storage at block 310, such as low-end storage 104.

In an embodiment, if a relevance value meets the threshold it may be deemed high importance and archived to high-end storage. Additionally or alternatively, if a relevance value meets the threshold it may be deemed low importance and archived to low-end storage.

In an embodiment, a one or more additional storage tiers may be used. For example, a mid-level storage may be provided in addition to the high-end and low-end. When a system comprises multiple storage tiers, multiple thresholds may be defined. For example, in a three-tier system thresholds of 80% and 20% may be defined. Data objects with relevance values exceeding 80% may be archived to high-end storage, data objects with relevance values between 20% and 80% may be archived to mid-level storage, and data objects with relevance values below 20% may be archived to low-end storage.

Distributing data objects throughout a tiered storage system may provide financial and performance benefits. Low priority objects may be placed on low-end storage, which may provide increased capacity and a lower cost. High priority objects may be stored on high-end storage. These objects may be business critical and accessed often. High-end storage provides superior performance, and archiving to this location allows the data objects to be quickly accessed and manipulated.

Figure 4:
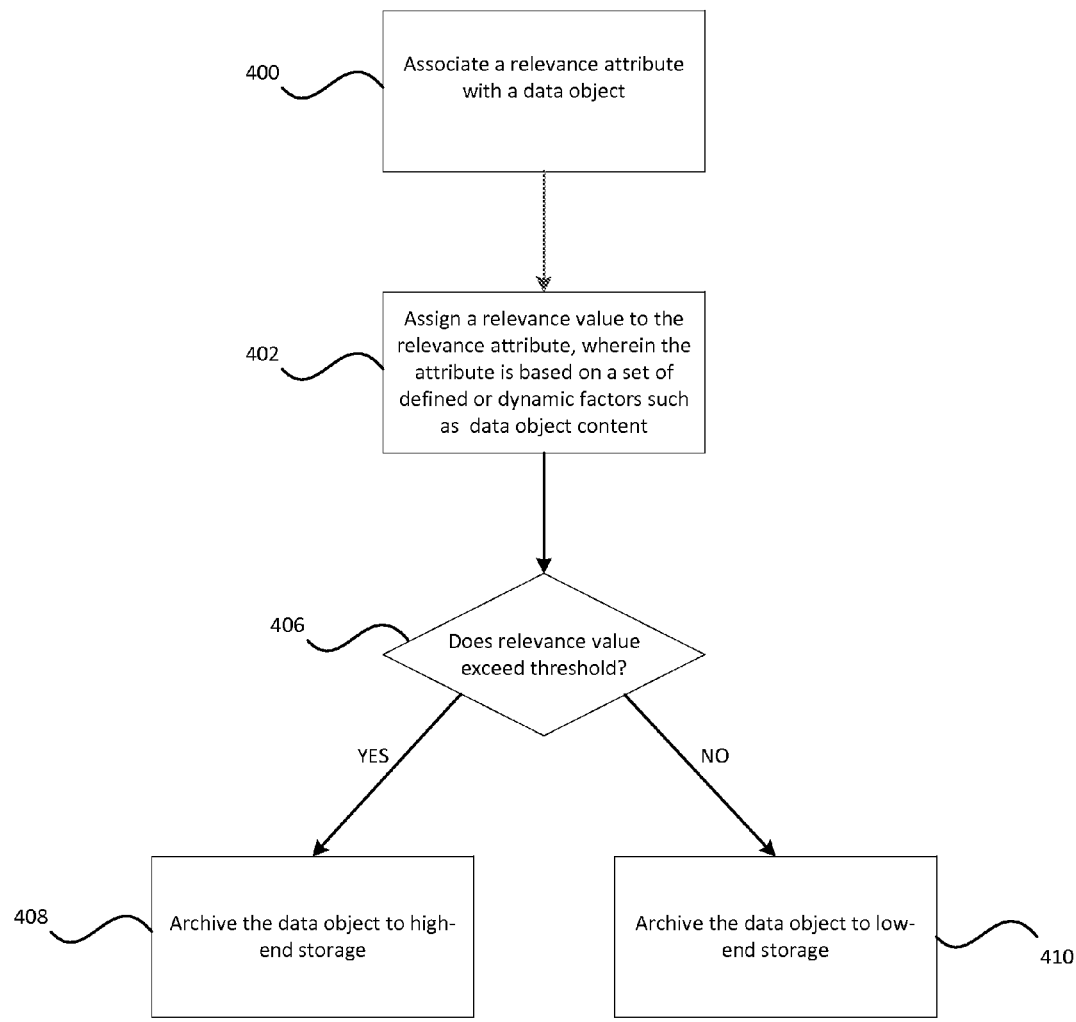
FIG. 4 is a flowchart of a method for assigning a relevance value to a relevance attribute using an analytics engine consistent with an embodiment of the present disclosure.

FIG. 4 depicts a method for archiving data objects based on a dynamic relevance value, which may be assigned by a policy engine. At 400, a data relevance attribute is associated with a data object. At 402, a relevance value is assigned to the attribute based on defined or dynamic factors. In an embodiment, this relevance value is assigned by a data analytics solution. A user may define a set of parameters for the solution, and these parameters may be used to assign an appropriate relevance value. For example, a user may instruct the analytics engine to use one or more metadata attributes to calculate the relevance.

In an embodiment, the analytics engine may consider a data object's content. For example, a user may be working on a particular project and provide the project name or other details to the analytics solution. The engine may then search data object content for key words or phrases provided by the user. The relevance value could then be assigned by the analytics solution based on the number of hits. If the project completes or the user switches to a new project, new text or patterns may be provided to the policy engine and the relevance values may be re-calculated.

In an embodiment, the analytics program may crawl through every file on a user's system each time the engine is updated with new parameters. Additionally or alternatively, relevance values may only be calculated for new data objects unless the user instructs the system to update every data object on the system. In an embodiment, the process may run in the background on the user's device. Running the process in the background may allow the system to be used while the data relevance values are being calculated and/or data objects are being archived.

At 406, the assigned relevance value is compared to a threshold. In an embodiment, this comparison is substantially similar to that performed at 306, discussed above. If the relevance value exceeds the threshold it may be archived to high-end storage at 408. If the relevance value fails to exceed the threshold it may be archived to low-end storage at 410. In an embodiment, if the relevance value meets the defined threshold it may be archived to high-end storage, low-end storage, both, or neither. Additionally or alternatively, the data object may be archived on one or more additional storage tiers.

Figure 5:
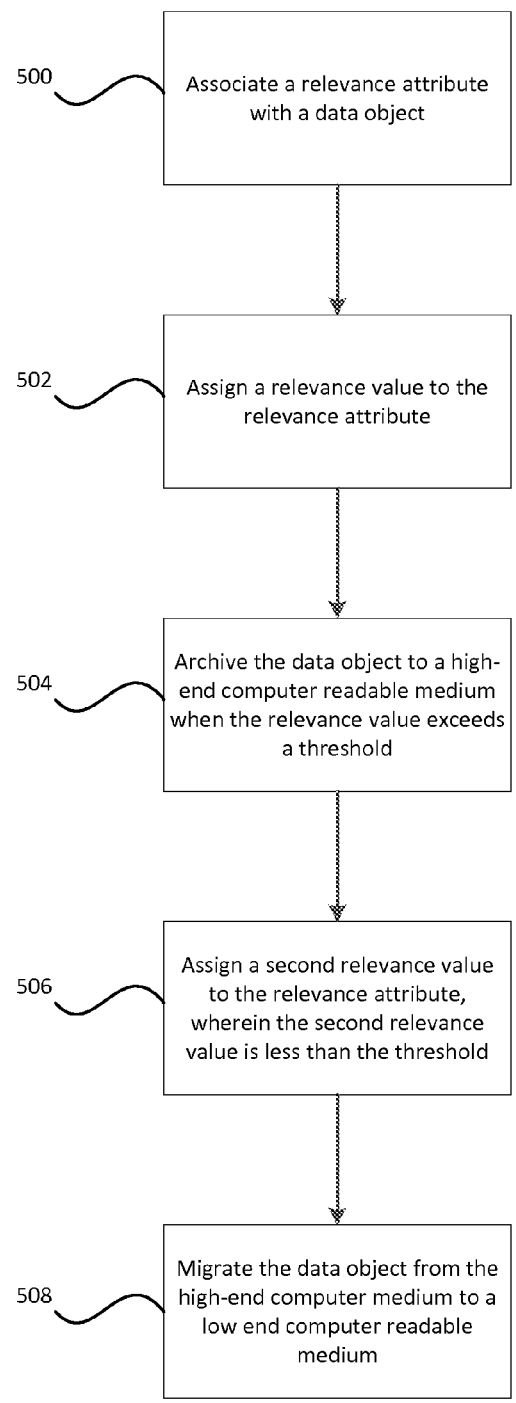
FIG. 5 is a flowchart of a method for migrating a data object from a high tier to a low tier of a scalable storage solution consistent with an embodiment of the present disclosure.

Turning now to FIG. 5, a method for migrating data objects from high-end storage to low-end storage is discussed. At 500 a relevance attribute is associated with the data object, and at 502 a relevance value is assigned to the attribute. This value could be assigned, for example, by a user or an analytics engine. In an embodiment, the relevance value may be based on the data object content.

At 504, the data object is archived on high-end storage when the relevance value exceeds a threshold. Archiving highly relevant data on high-end storage may increase system performance because the data object may be accessed and/or modified frequently.

At 506 a second relevance value may be assigned to the relevance attribute. In an embodiment, this second value replaces the original value. For example, a project may complete or a user may be reassigned. Documents related to the old project may no longer be relevant, while new documents may be particularly important. The user may therefore reduce the relevance value of a given data object to a lower value. Additionally or alternatively, a data analytics engine may automatically reduce the relevance value to a new level. In an embodiment, this second relevance value may fall below a defined threshold while the original value was above the threshold.

At 508, the data object may be migrated from the high-end storage to a low-end storage if the new relevance value does not exceed the threshold. Once the data object has been migrated to the low-end storage, it may be deleted from the high-end storage. As a result, storage resources may be released on the high-end storage to accommodate the new critical documents.

In an embodiment, new data object versions may be created when the objects are migrated at 508. For example, a data object may be archived on high-end storage, but have its relevance value changed to fall below the defined threshold. A new version of the data object may be created on the low-end storage, but the prior version may remain on the high-end. This could be helpful, for example, if the data object is critical in its original state, but less critical after a modification. For example, a master licensing agreement may always be considered important business data, and it may be desirable to always store the document on high-end storage. The document may undergo a review process, however, in which numerous draft modifications are made. As drafts, these modifications may be less important than the original document and may have a lower relevance value. They may be archived to the low end storage.

Figure 6:
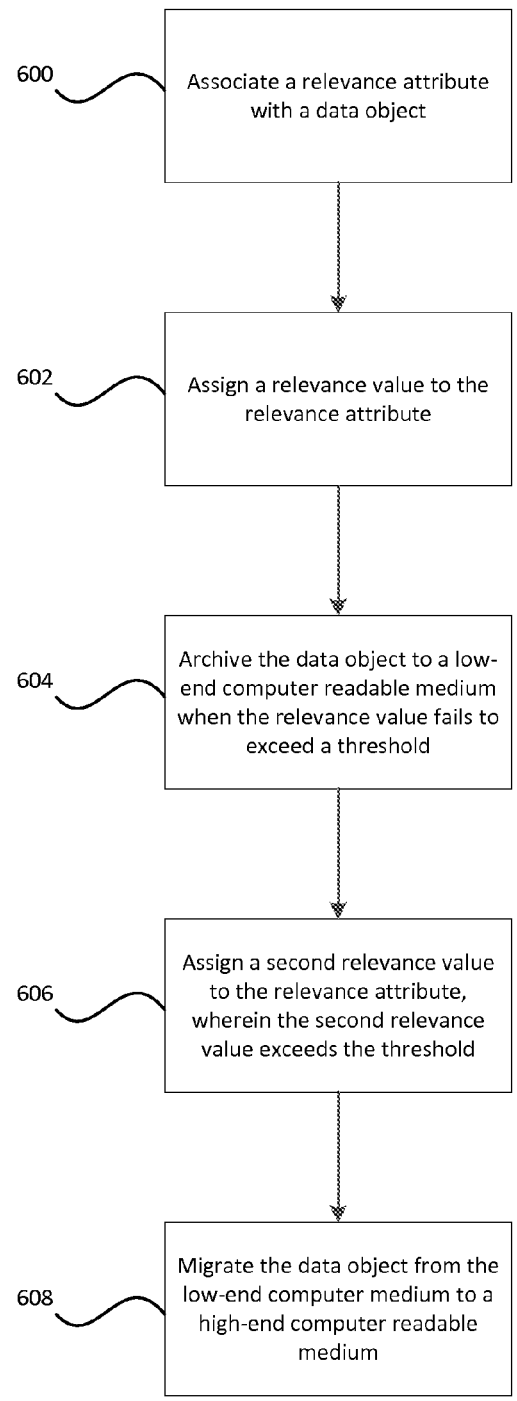
FIG. 6 is a flowchart of a method for migrating a data object from a low tier to a high tier of a scalable storage solution consistent with an embodiment of the present disclosure.

In reference to FIG. 6, a method for migrating data objects from low-end storage to high-end storage is discussed. In an embodiment, this method may be substantially similar to the method shown in FIG. 5. At 600 a data relevance attribute is associated with a data object, and at 602 a data relevance value is assigned to the attribute. In an embodiment, this value may be assigned by a user or a data analytics engine. At 604, the data object is archived to low-end storage when the relevance value fails to exceed a defined threshold. At block 606, a second data relevance attribute which exceeds the threshold is assigned to the attribute. For example, a user may change the relevance attribute based on a change in business priorities. At 608 the data object is migrated from the low-end storage to the high-end storage. Additionally or alternatively, a version of the data object may remain in the low-end storage.

Figure 7:
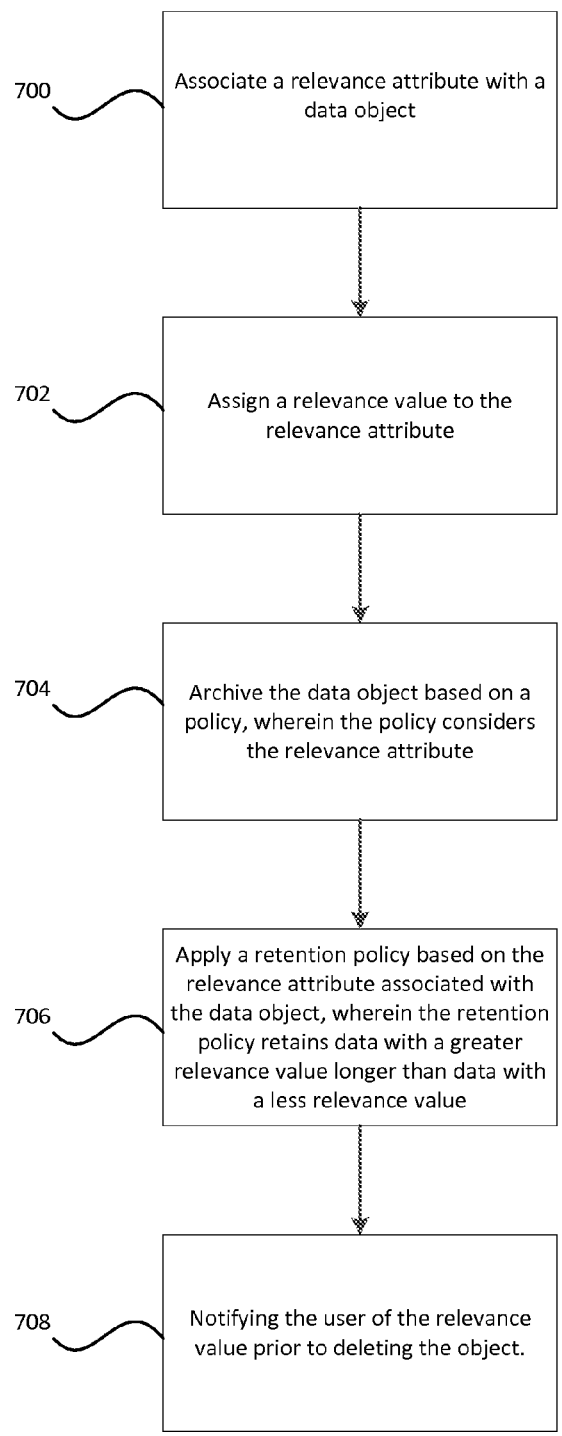
FIG. 7 is a flowchart of a method applying a retention policy to archived data objects consistent with an embodiment of the present invention.

Turning to FIG. 7, a method for archiving objects and applying a retention policy is discussed. Archive and backup systems may apply time based or event based retention policies. For example, an archived data object may only be retained for a fixed period of years before it is permanently deleted. Additionally or alternatively, the data objects may be deleted on the occurrence of a specific event, such as user termination. In an embodiment of the present disclosure, a relevance attribute may be considered by the retention policy.

At 700, a relevance attribute is associated with a data object, and at 702 the attribute is assigned a value. The value could be assigned, for example, by a user or data analytics engine. At 704, the attribute is archived based on a policy that considers the relevance value. This policy could, for example, determine whether the value exceeds a threshold and archive the data object to either high-end or low-end storage based on priority.

At 706, a retention policy is applied to the data object. This retention policy may apply to data objects on a user's machine and/or data objects residing in an archive. The retention policy may consider a data object relevance value to determine whether to retain the object. In an embodiment, the policy may use a threshold that could be the same or different than a threshold considered by the archiving policy. For example, a relevance value which exceeds a threshold may be permanently retained and never deleted. This could be beneficial for documents containing important information that is seldom accessed.

In an embodiment, the retention policy may consider multiple factors. For example, the policy may be based on both the relevance value and a time-to-live. Data objects with relevance values below a certain threshold may only be retained for a short duration. Additionally or alternatively, data objects with relevance values greater than a certain threshold may be retained for a longer duration. In an embodiment, the time-to-live may be scaled based on the relevance value rather that compared to thresholds. As the relevance value increases, the time to live could increase proportionately or exponentially. Additionally or alternatively, the policy may be event driven. For example, if a user is deleted from the system all of their archived data objects may be assigned a fixed time to live, regardless of the relevance value. Similarly, all data objects with a high relevance value may be permanently archived, regardless of subsequent events.

At 708, a user may be notified before an object is deleted. For example, before a retention policy removes a data object from the system, it may send a notification to a user. This may prevent important documents from being lost even when they have violated the retention policy. In an embodiment, a user may also be notified of the data object relevance value when they manually try to delete a data object from either their machine or remote storage. Such an embodiment may prevent accidental deletion, and may be beneficial in a shared environment where the document has varying importance to different users.

Figure 8:
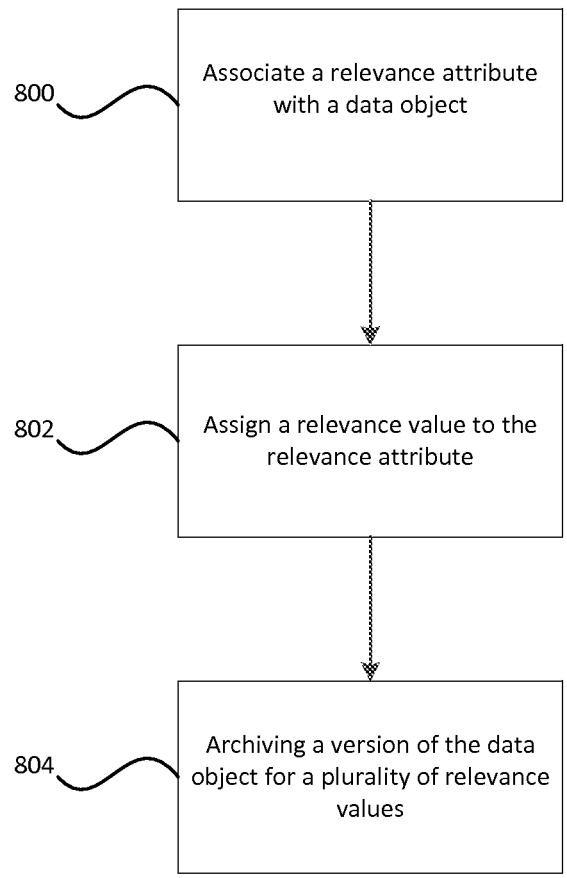
FIG. 8 is a flowchart of a method for archiving a plurality of data object versions based on a relevance value consistent with an embodiment of the present disclosure.

With reference to FIG. 8, a method for archiving a version of a data object for a plurality of relevance values is discussed. At 800 a relevance attribute is associated with a data object, and at 802 the relevance attribute is assigned a value. At 804, a version of the data object is archived for a plurality of relevance values. For example, if the data object, user priorities, and/or the data object's relevance value changes, a new version of that data object may be archived. These versions may be distributed between high-end and low-end storage, depending on the data object's assigned relevance value.

Figure 9:
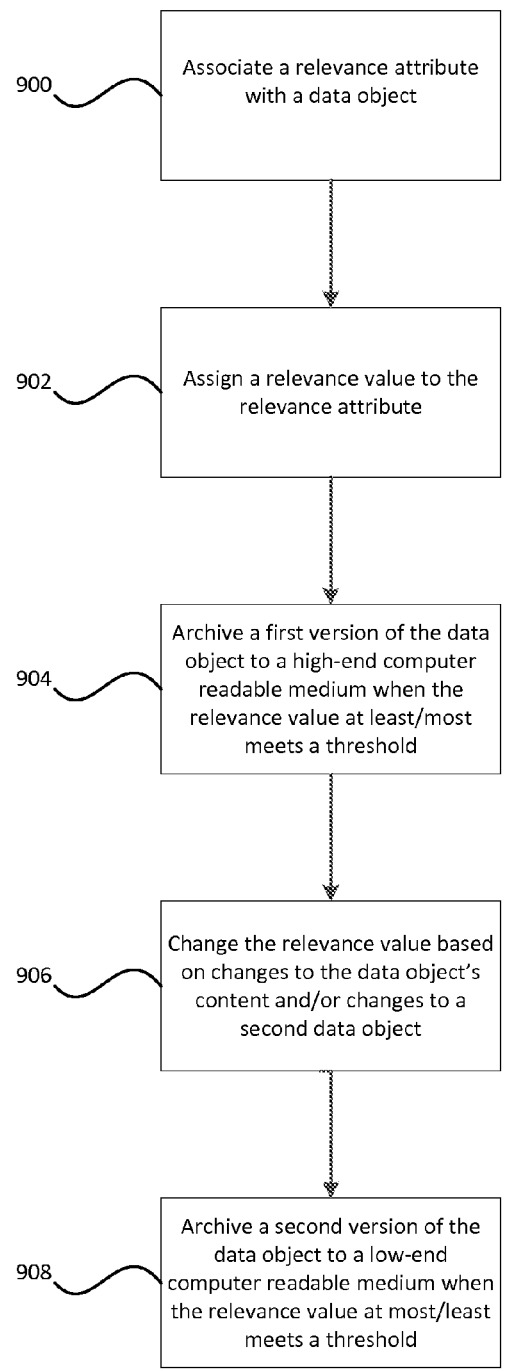
FIG. 9 is a flowchart of a method for archiving a plurality of data object versions on high-end and low-end storage consistent with an embodiment of the present disclosure.

Turning to FIG. 9, a method for archiving versions of a data object on high-end and low-end storage is discussed. This could be, for example, an embodiment of the method depicted in FIG. 8. At 900 a relevance value is associated with a data object and at 902 the attribute is assigned a relevance value. This relevance value may be used to determine whether the data object should be archived to high-end or low-end storage.

At 904, a first version of the data object is archived to a high-end computer readable medium. The first version may be archived when the assigned relevance value at least meets a defined threshold. Additionally or alternatively, the version be archived to high-end storage when the assigned value at most meets the threshold. In an embodiment, the archiving process is substantially similar to the process discussed with reference to FIG. 3.

At 906, the data object's relevance value may be changed. This change could occur, for example, based on a change in a user's priorities. In an embodiment, the change to the relevance value may be based on changes to the data object's content. For example, a draft of an important document may be finalized. As a result, the added content may increase the document's relevance. In an embodiment, the changes may be identified by a data analysis engine and the relevance value may be updated automatically.

In an embodiment, the changes may occur on a second data object. For example, the first data object's relevance may be dependent on the second data object's relevance. If the second data object's relevance value is reduced, the first data object's relevance value may also be reduced. Similarly, if the second data object's relevance value is increased, the first data object's relevance value may also be increased. Additionally or alternatively, the data object's relevance value may be changed when a second data object's content is modified. For example, the second data object may contain references to critical files or directories. If reference to the data object is added to, deleted from, or otherwise modified in the second data object, the data object's relevance value may be changed accordingly. Additionally or alternatively, any other data event impacting the second data object may be considered. In an embodiment, changes occurring on the second data object are automatically identified using a data analysis engine.

At 908, a second version of the data object may be archived to a low-end computer readable medium. This may occur when the relevance value at most meets a defined threshold, or at least meets a defined threshold. In an embodiment, archiving an additional version of a data object has no impact on prior versions. For example, if a prior version of the data object is stored on high-end storage, that version may remain even after the second version is stored on low-end storage. This may be helpful, for example, when a first version of a file is more important than later versions. For example, a document may provide a helpful licensing template. User's may modify the template to include licensing clauses, and these additions may have a lower priority than the original document. The initial template version may therefore remain on high-end storage, while the changed versions may be archived to low-end storage. Once a license is complete, the relevance value may be increased and the final license may be archived on high-end storage.

In an embodiment, a first version of a data object may be archived to low-end storage and the second version may be archived to high-end storage. Additionally or alternatively, a plurality of different versions may be distributed among the storage tiers, which may include one or more additional storage levels.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for archiving a plurality of data objects, the method comprising:
    associating a relevance attribute with at least one data object of the plurality of data objects, wherein the association of the relevance attribute is from an analytics engine;
    associating a first relevance value to the relevance attribute of the plurality of data objects, wherein at least one data object of the data objects with an unassigned relevance value is assigned a default relevance value;
    archiving the data objects to a first storage or a second storage based on the relevance attribute wherein the data objects having the first relevance value above a threshold value are stored in the first storage;
    associating a second relevance value to the relevance attribute of the plurality of data objects, wherein the second relevance value is below the threshold value; and
    migrating the data objects previously archived to the first storage having the second relevance value below the threshold value from the first storage to the second storage, wherein the first storage and the second storage are separate storage devices.

2. The method of claim 1, further comprising selecting a high-end computer readable medium as the first storage when the first relevance value exceeds the threshold.

3. The method of claim 1, further comprising selecting a low-end computer readable medium as the second storage when the first relevance value fails to exceed the threshold.

4. The method of claim 1, wherein the first relevance value is received from a user.

5. The method of claim 1, wherein the first relevance value is calculated based on a set of defined parameters.

6. The method of claim 1, further comprising archiving the data object only when the data object has an associated relevance value.

7. The method of claim 1, wherein the first relevance value is based on the data object's content.

8. The method of claim 7, further comprising assigning the second relevance value based on changes to the data object's content.

9. The method of claim 1, further comprising assigning the second relevance value based on changes to a second data object's content.

10. The method of claim 1, wherein archiving the data object further comprises archiving a version of the data object for a plurality of relevance values.

11. The method of claim 1, further comprising:
    archiving a first version to a high-end computer readable medium when the first relevance value at least meets a threshold; and
    archiving a second version to a low-end computer readable medium when the second relevance value at most meets the threshold.

12. The method of claim 1, further comprising:
    archiving a first version to a high-end computer readable medium when the first relevance value at most meets a threshold; and
    archiving a second version to a low-end computer readable medium when the second relevance value at least meets the threshold.

13. The method of claim 1, further comprising applying a retention policy based on the relevance attribute associated with the data object.

14. The method of claim 13, wherein the retention policy comprises retaining a data object with a greater relevance value for a longer period than a data object with a lesser relevance value.

15. The method of claim 1, further comprising notifying a user of the second relevance value before deleting the data object.

16. A computer program product for archiving a plurality of data objects, comprising a non-transitory computer readable medium having program instructions embodied therein for:
    associating a relevance attribute with at least one data object of each of the plurality of data objects, wherein the association of the relevance attribute is from an analytics engine;
    associating a first relevance value to the relevance attribute of each of the plurality of data objects, wherein at least one data object of the data objects with an unassigned relevance value is assigned a default relevance value;
    archiving the data objects to a first storage or a second storage based on the relevance attribute wherein the data objects having the first relevance value above a threshold value are stored in the first storage and the data objects having the first relevance value below the threshold value are stored in the second storage, wherein the first storage and the second storage are separate storage devices;
    associating a second relevance value to the relevance attribute of the plurality of data objects, wherein the second relevance value is below the threshold value; and
    migrating the data objects previously archived to the first storage having the second relevance value below the threshold value from the first storage to the second storage.

17. A system for archiving a plurality of data objects comprising a non-transitory computer readable medium and a processor configured to:

associate a relevance attribute with at least one data object of each of the plurality of data objects, wherein the association of the relevance attribute is from an analytics engine;

associate a first relevance value to the relevance attribute of each of the plurality of data objects, wherein at least one data object of the data objects with an unassigned relevance value is assigned a default relevance value;

archiving the data objects to a first storage or a second storage based on the relevance attribute wherein the data objects having the first relevance value above a threshold value are stored in the first storage and the data objects having the first relevance value below the threshold value are stored in the second storage, wherein the first storage and the second storage are separate storage devices;

associating a second relevance value to the relevance attribute of the plurality of data objects, wherein the second relevance value is below the threshold value; and migrating the data objects previously archived to the first storage having the second relevance value below the threshold value from the first storage to the second storage.

* * * * *